Sept. 29, 1953     H. E. TEBBETTS, JR     2,653,817
BALL TETHERING DEVICE
Filed July 25, 1949     2 Sheets-Sheet 1
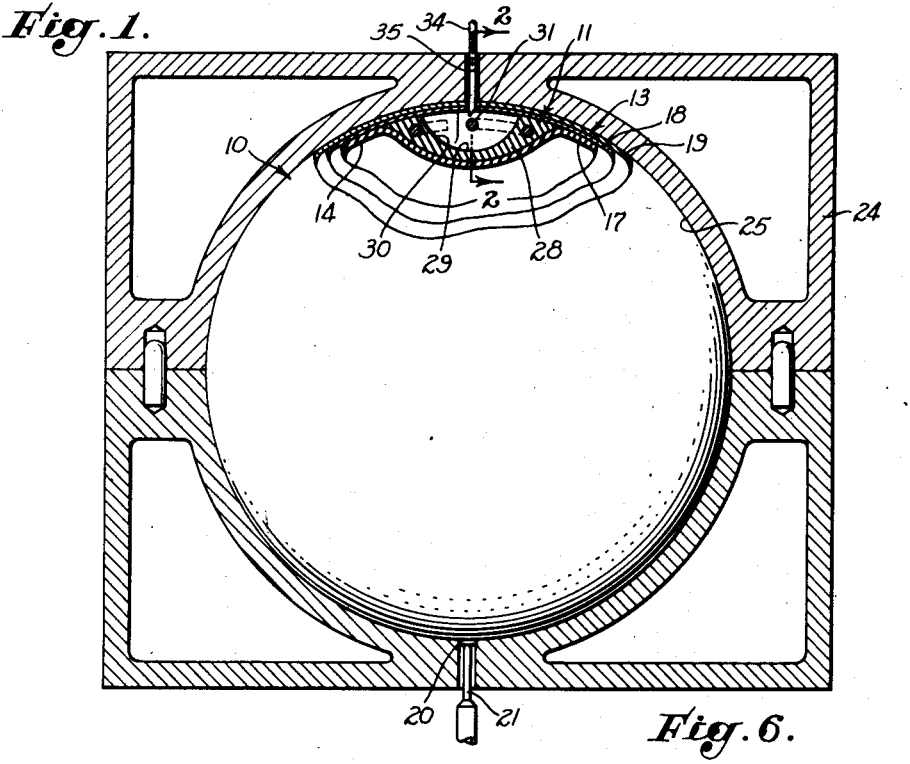
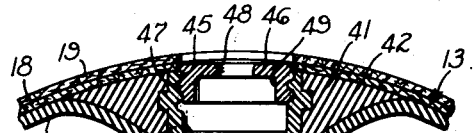
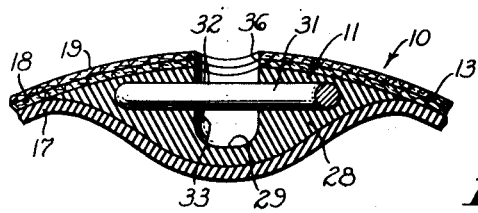
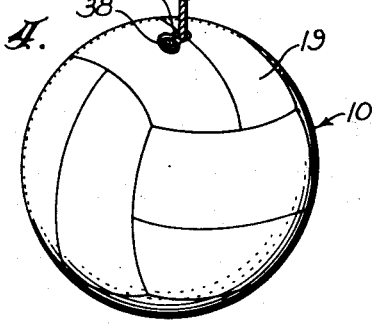
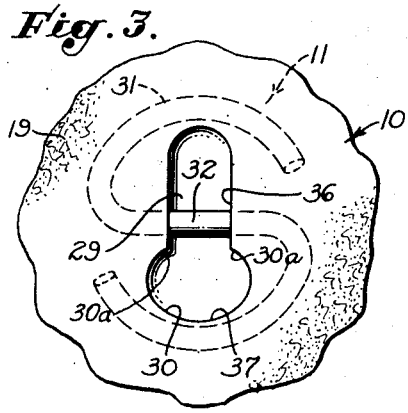
INVENTOR.
HERBERT EDWIN TEBBETTS, JR.
BY HIS ATTORNEYS.
HARRIS, KIECH, FOSTER & HARRIS Sept. 29, 1953   H. E. TEBBETTS, JR   2,653,817
BALL TETHERING DEVICE Filed July 25, 1949   2 Sheets-Sheet 2

INVENTOR.
HERBERT EDWIN TEBBETTS, JR.

BY HIS ATTORNEYS.
HARRIS, KIECH, FOSTER & HARRIS
BY

Patented Sept. 29, 1953

2,653,817

UNITED STATES PATENT OFFICE 2,653,817

BALL TETHERING DEVICE

Herbert Edwin Tebbetts, Jr., Whittier, Calif., assignor to W. J. Voit Rubber Corporation, Los Angeles, Calif., a corporation of California Application July 25, 1949, Serial No. 106,706

3 Claims. (Cl. 273—58)

My invention relates in general to molded articles and their manufacture and, more particularly, to balls of moldable materials of a rubberlike nature. As used herein, the term "moldable material" is intended to include not only natural rubber, but any similar synthetic materials, such as the so-called "synthetic rubbers," thermoplastics, and thermosetting resins.

A primary object of the invention is to provide a ball which may be restrained, or "tethered," by a cord, or its equivalent, of any suitable material. The invention may take the form of an athletic tether ball, a ball or float for supporting fish nets, a sewer ball, etc. For convenience, the term "tether ball" will be employed generically hereinafter to designate any such ball embodying the invention without limiting the invention to an athletic tether ball.

An important object of my invention is to provide a tether ball having an attachment means for a tethering cord which is securely bonded to the wall of the ball so that, in effect, it forms an integral part thereof.

Another object is to provide a tether ball having a cord attachment means which includes an attachment member, preferably of moldable material, bonded to the wall of the ball.

Another object is to provide a ball wherein the cord attachment means comprises a securing member embedded in the attachment member and extending into a cavity therein, the securing member being adapted to have connected thereto a tethering cord which is insertable into the cavity in the attachment member.

Another object is to provide a generally S-shaped securing member which is embedded in the attachment member and which is provided with an intermediate portion spanning the cavity in the attachment member, such intermediate portion of the securing member being adapted to have a tethering cord looped therearound.

Still another object is to provide a tether ball wherein the cavity in the attachment member is generally keyhole shaped and includes an enlargement at one end, such enlargement being adapted to receive a knot or other enlargement at one end of a tethering cord which is looped around the intermediate portion of the S-shaped securing member. The knot serves to prevent disengagement of the cord from the securing member and is substantially entirely disposed within the enlargement of the keyhole-shaped cavity so that a ball having an outer surface substantially free from protuberances is obtained, which is an important feature of the invention.

A further object is to provide an attachment member for a tether ball, which provides means for securing a tethering cord to the ball.

An important object of the invention is to provide an attachment member which may be bonded to either the inner or outer surface of the wall of an inflatable tether ball, or which may be placed between and bonded to adjacent laminae of the wall in the event that a wall of laminated construction is used.

The foregoing objects of my invention and the advantages suggested thereby, together with various other objects and advantages which will become apparent, may be attained through the utilization of the exemplary embodiments which are illustrated in the accompanying drawings and which will be described in detail hereinafter. Referring to the drawings:

Fig. 1 is an elevational view, partially in section, illustrating a tether ball of laminated construction which embodies the invention and illustrating one step in the manufacture of the ball;

Fig. 2 is an enlarged, fragmentary sectional view taken along the broken line 2—2 of Fig. 1 and illustrating an attachment means for a tethering cord as incorporated in the ball of Fig. 1;

Fig. 3 is an enlarged, fragmentary elevational view showing the exterior of the ball of Fig. 1 in the vicinity of the attachment means and showing elements of the attachment means in dotted lines;

Fig. 4 is a perspective view showing, on a reduced scale, a completed tether ball which embodies the invention and showing a tethering cord connected to the attachment means thereof;

Figure 7:
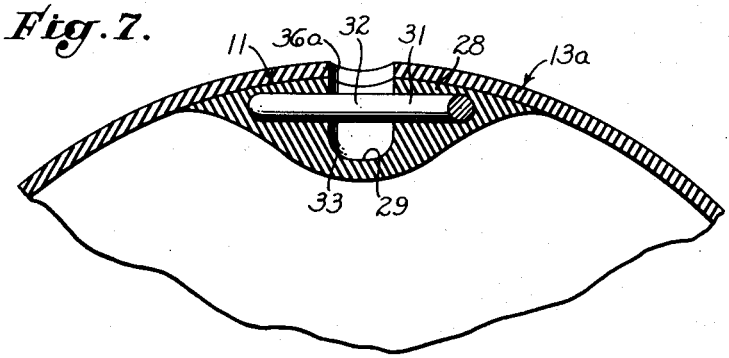
Figure 8:
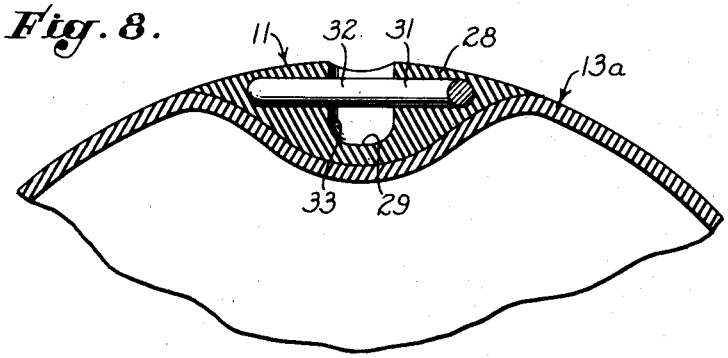

Fig. 6 is an enlarged, fragmentary sectional view similar to Fig. 2 of the drawings but illustrating another embodiment of an attachment means for a tethering cord as incorporated in a tether ball of laminated construction; and Figs. 7 and 8 are enlarged, fragmentary sectional views similar to Fig. 2 of the drawings but showing the attachment means illustrated in Fig. 2 incorporated in tether balls of non-laminated construction, the attachment means being located interiorly of the wall of the ball in Fig. 7 and exteriorly thereof in Fig. 8.

Figure 5:
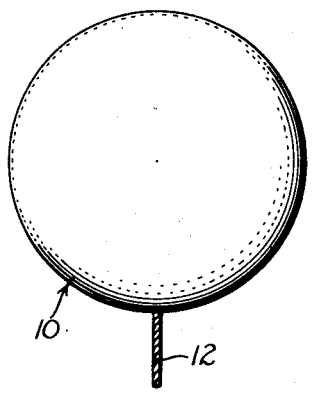
Fig. 5 is a perspective view, on a reduced scale, of another completed tether ball which embodies the invention.

Considering the embodiment of my invention which is illustrated in Figs. 1 to 3 of the drawings, the numeral 10 indicates a laminated tether ball of molded construction, the ball 10 being provided with an attachment means 11 to which a cord 12 for tethering the ball may be connected, as indicated in Figs. 4 and 5 of the drawings. The ball 10 is inflatable and includes a wall structure 13 which defines a space 14 for an inflating gas such as air. Except for the provision of the attachment means 11 for the tethering cord 12, the ball 10 is of conventional laminated construction and may be made by conventional methods.

As best shown in Fig. 1 of the drawings, the wall structure 13 of the ball 10 includes three layers or laminae in the particular construction illustrated, these laminae being identified by the numerals 17, 18 and 19. The innermost lamina 17 is formed of moldable material and is adapted to retain air or other gas in the space 14, a suitable inflating valve 20 being permanently secured to the lamina 17 in a manner not specifically shown but well known in the art. Air for inflating the ball 10 may be introduced into the space 14 through the valve 20 by means of a needle 21, or in any other suitable manner. The air or other inflating gas introduced into the space 14 through the valve 20 is retained by the inner lamina 17, which may be termed a bladder for convenience.

The lamina 18 is disposed intermediate the bladder 17 and the outermost lamina 19 and is bonded thereto so that, in effect, the laminae 17, 18 and 19 form an integral wall structure 13. The intermediate lamina 18 reinforces the wall structure 13 of the ball and may be formed of any suitable material, although a material of a fibrous nature is preferred. For example, the reinforcing lamina or layer 18 may be formed of fabric bonded to the laminae 17 and 19, or may be formed of thread or cord wound around the bladder 17 and bonded to the bladder and the lamina 19. Although I have shown but a single reinforcing layer 18, it will be understood that more than one may be employed if desired.

The outer lamina 19 constitutes a cover for the ball 10 and may be formed of any suitable wear-resisting material, particularly if the ball is used as an athletic ball. For example, the cover 19 may comprise leather bonded to the reinforcing layer 18, although I prefer to provide a ball wherein the cover is formed of a moldable material. In the event that a moldable material is used for the cover 19, particularly if the ball 10 is used as an athletic ball, the cover may be grooved, as indicated in Fig. 4, to simulate the seams of a conventional leather cover, if desired. The cover may also be left ungrooved, as indicated in Fig. 5, particularly if the ball 10 is used as a float for fish nets, or otherwise.

As heretofore mentioned, the wall structure 13 of the ball 10 may be made by conventional methods, an example of which will now be considered. As commonly practiced, a first step in making the wall structure 13 is to take a bladder 17 and partially inflate it to a size somewhat less than the desired size of the finished ball. A coating of a vulcanizable material, such as latex or rubber cement, is then applied to the bladder 17, as by dipping or spraying, for example. Subsequently, the reinforcing layer 18 is applied to the coated bladder, pieces of fabric being placed thereon if a fabric-reinforcing layer is employed, and thread or cord being wound thereon if a wound reinforcing layer is employed. Preferably, a rubberized reinforcing material is employed.

Another coating of vulcanizable rubber material is applied to the reinforcing layer 18, and the cover 19 is then applied. Subsequently, the ball is placed in a suitable mold, such as a mold 24, having a cavity 25 corresponding in size and shape to the size and shape desired for the finished ball. As indicated previously, if a rubber cover 19 is employed as is preferred, the wall of the mold cavity 25 may be provided with ridges, or the like, to produce any desired design on the surface of the finished ball, as illustrated in Fig. 4 of the drawings, or the finished ball may be smooth, as illustrated in Fig. 5 of the drawings.

Subsequently, the mold 24 is heated in any suitable manner to bond the various components of the ball together, thereby bonding the laminae 17, 18 and 19 together to form, in effect, an integral wall structure 13 for the ball. Subsequently, the finished ball 10 is deflated and removed from the mold.

As previously indicated, the wall structure 13 of the ball and the foregoing method of making it per se form no part of the present invention, the invention residing in the provision of a ball having the attachment means 11 incorporated therein and in the provision of a method of making such a ball.

The attachment means 11 of the invention includes an attachment member 28, preferably, but not necessarily, formed of a moldable material, which, in the embodiment being considered, is preferably inserted between two of the laminae 17, 18 and 19 forming the wall structure 13 of the ball, the attachment member preferably, but not necessarily, being of circular plan form. In the particular construction illustrated, the attachment member 28 is disposed between the bladder 17 and the reinforcing layer 18, although, in some instances, it may be otherwise located with respect to the laminae 17, 18 and 19.

The attachment member 28 is provided with a cavity 29 therein, which, as best shown in Fig. 3 of the drawing, is preferably generally keyhole shaped, the cavity having an enlargement 30 at one end thereof. At the junction of the enlargement 30 of the cavity 29 and the smaller portion of such cavity are shoulders 30a which face the enlargement and which are adapted to serve as seats for a knot disposed in the enlargement to prevent movement of the knot from the enlargement into the relatively narrow portion of the cavity 29, is discussed in more detail hereinafter. Embedded in the attachment member 28, as by being molded therein, is a securing means comprising a generally S-shaped securing member 31 having a portion 32 intermediate its ends which extends across the cavity 29 adjacent the enlargement 30 thereof. As best shown in Fig. 2 of the drawing, the intermediate portion 32 of the member 31 is spaced from the bottom of the cavity 29 to provide an opening 33 for the tethering cord 12 as will be discussed in more detail herein.

After the rubber coating has been applied to the partially inflated bladder 17 in the manner hereinbefore described, the member 28 with the member 31 therein is placed on the bladder in the desired position. Preferably, a coating of bonding material such as latex, rubber cement, or other suitable material, is applied to the outer surface of the member 28. Subsequently, the reinforcing layer 18 and the cover 19 are placed on the partially inflated bladder 17 and over the member 28 in a manner similar to that described hereinbefore, the reinforcing layer and cover overlying the cavity 29 in the member 28 at this stage. It will be noted that the member 28 is tapered toward its periphery so that the bladder 17 and the reinforcing layer 18 are in contact immediately adjacent the periphery of this member.

After the attachment member 28 has been placed on the bladder 17 and the reinforcing layer 18 and cover 19 have been placed over the bladder and this member, the ball is placed in the mold cavity 25 and the ball is subsequently cured in the manner hereinbefore described so that the laminae 17, 18 and 19 and the member 28 are all bonded together, to form in effect an integral structure. When the ball is placed in the mold cavity 25, and is inflated therein to a relatively high pressure, the wall of the mold cavity prevents outward movement of the member 28 so that, as a result, the bladder 17 is depressed inwardly, thereby providing the ball with a smooth outer contour. After the ball is removed from the mold 24 and is subsequently inflated for use, the reinforcing layer 18 prevents outward movement of the member 28 to preserve the shape provided by the mold. For this reason, the attachment member 28 is preferably disposed between the bladder 17 and the reinforcing layer 18 although the invention is not necessarily limited to disposing the member 28 between the layers 17 and 18. For example, the member 28 may be disposed between the layers 18 and 19, or if more than one reinforcing layer are used, it may be disposed between adjacent ones of such reinforcing layers. Also, as will become apparent, the member 28 may be disposed interiorly or exteriorly of the wall structure 13.

After removal of the ball from the mold 24, the portions of the reinforcing layer 18 and cover 19 overlying the cavity 29 in the attachment member 28 are cut away to provide a generally keyhole-shaped opening 36 therethrough which registers with the keyhole-shaped cavity 29, the opening 36 having an enlargement 37 which corresponds to and registers with the enlargement 30 of the cavity 29. The provision of the opening 36 completes the manufacture of the ball 10.

When the ball 10 is to be prepared for use, the tethering cord 12 is looped around the intermediate portion 32 of the securing member 31 embedded in the attachment member 28 by inserting one end of the cord through the opening 33 between the intermediate portion 32 of the member 31 and the bottom of the cavity 29. Withdrawal of the cord 12 through the opening 33 is prevented by a knot 38 on the cord in the particular construction illustrated, the knot preferably being formed at one end thereof. As will be apparent, the knot 38 engages the shoulders 30a to prevent passage of the knot into the reduced portion of the cavity 29. The enlargement 30 of the cavity 29 is preferably of a size to receive the entire knot 38 so that no portion of the knot projects outwardly beyond the outer surface of the cover 19 of the ball. This is particularly important if the tether ball 10 is used as an athletic tether ball since it avoids any protuberances which might injure the hands of a player using the ball, and is an important feature of my invention. The cord 12 may also be secured to the member 31 in other ways, as by looping the cord around the portion 32 thereof, for example. Also, a hook (not shown) may be provided at one end of the cord for engagement with the member 31.

Referring to Fig. 6 of the drawings, I show another embodiment of my invention wherein the ball is provided with an attachment means 41 which performs the same function as the attachment means 11. The attachment means 41 comprises an attachment member 42 which is disposed between and bonded to the bladder 17 and the reinforcing layer 18 in the particular construction illustrated, although it may be placed in any desired position with respect to the laminae 17, 18 and 19 forming the wall structure 13 of the ball as previously discussed. Embedded in the member 42, as by being molded therein, is a securing means comprising a bushing 43 having a cavity 44 therein, the wall of the cavity 44 having threads 45 thereon which extend into the cavity. Adapted to be threaded into the cavity 44 is a plug 46 having external threads 47 thereon which are adapted to engage the threads 45 on the wall of bushing cavity 44. The plug 46 is provided with an opening 48 therethrough for a tethering cord such as the cord 12, and is provided with a cavity 49 which cooperates with the inner portion of the cavity 44 in the bushing to provide a space for a knot at the inner end of the cord inserted through the opening 48. In this construction, the knot is completely confined in the space provided in the cavity 49 and the inner portion of the cavity 44 so that the outer surface of the ball is free from protuberances.

It is also to be noted that the attachment members 11 and 42 may be separately made and sold to the trade for incorporation in an otherwise conventional inflatable tether ball, and the invention contemplates such an attachment member per se.

In Figs. 7 and 8 of the drawings, I show tether ball embodiments each having a nonlaminated wall structure 13a of a moldable material. In Fig. 7, the attachment means 11 is shown bonded to the inner surface of the wall structure 13a, whereas, in Fig. 8, it is shown bonded to the outer surface thereof. In Fig. 7, the wall structure 13a is shown provided with a cavity 36a registering with the cavity 29. The external surface of the wall structure 13a may be grooved, as in Fig. 4, or left plain, as in Fig. 5. It will be understood that the attachment means 41 may be substituted for the means 11 in the embodiments of Figs. 7 and 8.

Thus, it will be apparent that the invention may be applied to tether balls of both laminated and nonlaminated construction.

Although I have disclosed exemplary embodiments of my invention herein for purposes of illustration, it will be understood that various changes, modifications and substitutions may be incorporated therein without departing from the spirit of the invention.

I claim as my invention:

1. An attachment member for a ball, including: a body portion adapted to be secured to the ball, said body portion having an inner and an outer wall surface and a cavity formed in said outer wall surface, said cavity having a relatively narrow portion and a relatively wide portion, there being shoulders at the junction of said relatively wide portion with said relatively narrow portion which face said relatively wide portion and which are adapted to serve as seats for a knot disposed in said relatively wide portion to prevent movement of such knot from said relatively wide portion into said relatively narrow portion; and securing means in said cavity for securing a cord to said body portion and disposed between said narrow and wide portions of said cavity.

2. An attachment member for a ball, including: a body portion adapted to be secured to the ball, said body portion having an inner and an outer wall surface and having a generally keyhole-shaped cavity in said outer wall surface, said cavity having a relatively narrow portion to snugly receive a cord and a relatively wide portion to snugly receive a knot at one end of the cord, said relatively narrow portion and said relatively wide portion providing shoulders at their junction which face said relatively wide portion to serve as seats for the knot to keep the knot from being drawn into said relatively narrow portion; and securing means carried by said body portion and extending across said cavity above the bottom thereof and adjacent the junction of said relatively narrow and relatively wide portions thereof, the cord being adapted to pass under said securing means.

3. An attachment member for a ball as defined in claim 2 wherein said securing means includes a substantially S-shaped securing member the middle leg of which extends across said relatively narrow portion of said cavity above the bottom thereof and adjacent the junction of said relatively narrow portion with said relatively wide portion, said S-shaped securing member being embedded in said body portion.

HERBERT EDWIN TEBBETTS, Jr.

References Cited in the file of this patent

UNITED STATES PATENTS

| Number | Name | Date |
|---|---|---|
| 782,332 | Goldsmith | Feb. 14, 1905 |
| 830,582 | Fleischman | Sept. 11, 1906 |
| 1,421,407 | Clark | July 4, 1922 |
| 1,941,877 | Brazeau | Jan. 2, 1934 |
| 2,115,926 | Hatton | May 3, 1938 |
| 2,226,246 | Kloepping | Dec. 24, 1940 |
| 2,500,073 | Hayes | Mar. 7, 1950 |

FOREIGN PATENTS

| Number | Country | Date |
|---|---|---|
| 680,341 | France | Jan. 18, 1930 |
| 597,176 | Germany | May 18, 1934 |